(12) United States Patent
Shin et al.

(10) Patent No.: US 11,563,320 B2
(45) Date of Patent: Jan. 24, 2023

(54) APPARATUS AND METHOD FOR DETERMINING TRANSFORMER STATE BASED ON CORRECTION OF DISSOLVED GAS DATA

(71) Applicant: OnePredict Co., Ltd, Seoul (KR)

(72) Inventors: Jae Kyung Shin, Seoul (KR); Jin Shi Cui, Seoul (KR); Bo Seong Seo, Seoul (KR)

(73) Assignee: ONEPREDICT CO., LTD., Seoul (KR)

( * ) Notice: Subject to any disclaimer, the term of this patent is extended or adjusted under 35 U.S.C. 154(b) by 142 days.

(21) Appl. No.: 16/949,810

(22) Filed: Nov. 16, 2020

(65) Prior Publication Data
US 2022/0021203 A1 Jan. 20, 2022

(30) Foreign Application Priority Data
Jul. 20, 2020 (KR) .................. 10-2020-0089643
Sep. 22, 2020 (KR) .................. 10-2020-0121940

(51) Int. Cl.
*H02H 9/00* (2006.01)
*H01F 27/40* (2006.01)
*H02H 5/08* (2006.01)

(52) U.S. Cl.
CPC ........... *H02H 9/002* (2013.01); *H01F 27/402* (2013.01); *H02H 5/08* (2013.01); *H01F 2027/404* (2013.01)

(58) Field of Classification Search
CPC ........ H02H 9/002; H02H 5/08; H01F 27/402; H01F 2027/404

(Continued)

(56) References Cited

U.S. PATENT DOCUMENTS

| 2013/0024131 A1* | 1/2013 | Lamontagne ......... H01F 27/402 702/24 |
| 2021/0117449 A1* | 4/2021 | Cheim ............... H02J 13/00002 |
| 2021/0270797 A1* | 9/2021 | Cheim ..................... H02H 7/04 |

FOREIGN PATENT DOCUMENTS

| CN | 207336353 U | * 5/2018 |
| KR | 2014-0041568 A | 4/2014 |
| WO | 2019141856 A1 | 7/2019 |

OTHER PUBLICATIONS

W. Huang et al., "A Data Mining Approach for Transformer Failure Rate Modeling Based on Daily Oil Chromatographic Data," in IEEE Access, vol. 8, pp. 174009-174022, 2020, doi: 10.1109/ACCESS. 2020.3026171 (Year: 2020).*

(Continued)

*Primary Examiner* — Thienvu V Tran
*Assistant Examiner* — Sreeya Sreevatsa
(74) *Attorney, Agent, or Firm* — Mark T. Vogelbacker; Eckert Seamans Cherin & Mellott, LLC

(57) ABSTRACT

A method for determining a transformer state on the basis of correction of dissolved gas data includes receiving, by a transformer state determination apparatus, dissolved gas data, determining, by the transformer state determination apparatus, a measurement error value which is a correction target in the dissolved gas data, correcting, by the transformer state determination apparatus, the measurement error value, and determining, by the transformer state determination apparatus, a transformer state on the basis of the dissolved gas data including the corrected measurement error value.

6 Claims, 8 Drawing Sheets

(58) Field of Classification Search
USPC ........................................................ 307/125
See application file for complete search history.

(56) References Cited

OTHER PUBLICATIONS

Office Action dated Aug. 22, 2022 from corresponding Korean App. No. 10-2020-0121940.

* cited by examiner

1)

OIL-FILTERING DETERMINATION GAS(500)

| TRANSFORMER | DIAGNOSIS DATE | H2 | C2H2 | C2H4 | C2H6 | CH4 | CO |
|---|---|---|---|---|---|---|---|
| MTR01 | 1994.02.14 | 4 | 0 | 2 | 1 | 2 | 147 |
| | 1995.02.07 | 1 | 0 | 4 | 2 | 4 | 269 |
| | 1996.02.26 | 26 | 0 | 7 | 8 | 13 | 228 |
| | 1997.07.29 | NaN | 0 | 0 | 1 | 2 | 410 |
| | 1997.11.27 | 11 | 0 | 11 | 3 | 7 | 323 |
| | 1998.03.02 | 21 | 0 | 9 | NaN | 6 | 482 |
| | 1998.08.11 | NaN | 0 | 11 | 2 | 5 | 341 |
| | 1988.12.17 | 25 | 0 | 13 | 2 | 8 | 562 |

ESTIMATED AS FILTERING DUE TO 60% OR MORE REDUCTION IN CH4, C2H3, AND C2H6 GASES

⇩

2)

| TRANSFORMER | DIAGNOSIS DATE | H2 | C2H2 | C2H4 | C2H6 | CH4 | CO |
|---|---|---|---|---|---|---|---|
| MTR01 | 1994.02.14 | 4 | 0 | 2 | 1 | 2 | 147 |
| | 1995.02.07 | 1 | 0 | 4 | 2 | 4 | 269 |
| | 1996.02.26 | 26 | 0 | 7 | 8 | 13 | 228 |
| | 1997.07.29 | NaN | 0 | 0 | 1 | 2 | 410 |
| | 1997.11.27 | 11 | 0 | 11 | 3 | 7 | 323 |
| | 1998.03.02 | 21 | 0 | 9 | NaN | 6 | 482 |
| | 1998.08.11 | NaN | 0 | 11 | 2 | 5 | 341 |
| | 1988.12.17 | 25 | 0 | 13 | 2 | 8 | 562 |

CORRECTION ALGORITHM DOES NOT WORK BECAUSE FILTERING TIME POINT IS INCLUDED

OIL-FILTERING TIME POINT(520)

ALGORITHM WORKS BECAUSE FILTERING TIME POINT IS NOT INCLUDED

⇩

3)

| TRANSFORMER | DIAGNOSIS DATE | H2 | C2H2 | C2H4 | C2H6 | CH4 | CO |
|---|---|---|---|---|---|---|---|
| MTR01 | 1994.02.14 | 4 | 0 | 2 | 1 | 2 | 147 |
| | 1995.02.07 | 1 | 0 | 4 | 2 | 4 | 269 |
| | 1996.02.26 | 26 | 0 | 7 | 8 | 13 | 228 |
| | 1997.07.29 | NaN | 0 | 0 | 1 | 2 | 410 |
| | 1997.11.27 | 11 | 0 | 11 | 3 | 7 | 323 |
| | 1998.03.02 | 21 | 0 | 9 | 2.3 | 6 | 482 |
| | 1998.08.11 | 22.9 | 0 | 11 | 2 | 5 | 341 |
| | 1988.12.17 | 25 | 0 | 13 | 2 | 8 | 562 |

CORRECT MISSING VALUE THROUGH CORRECTION ALGORITHM

FIG. 5

APPARATUS AND METHOD FOR DETERMINING TRANSFORMER STATE BASED ON CORRECTION OF DISSOLVED GAS DATA

CROSS-REFERENCE TO RELATED APPLICATIONS

The present application claims priority to and the benefit from Korean Patent Application No. 10-2020-0089643, filed Jul. 20, 2020, and Korean Patent Application No. 10-2020-0121940, filed Sep. 22, 2020, each of which are hereby incorporated by reference in their entirety.

BACKGROUND

1. Field of the Invention

The present invention relates to a method of determining a transformer state on the basis of correction of dissolved gas data and an apparatus employing the method. More particularly, the present invention relates to an apparatus and method for determining a transformer state more accurately by correcting a measurement error value in dissolved gas data.

2. Discussion of Related Art

With rapid industrial development, the demand for electric energy has drastically increased, leading to an increase in use of power transformers. Accordingly, many currently installed transformers are aged, and unpredictable equipment accidents frequently occur. Since the capacities of power transformers have been increased and power systems have been complicated, an accident caused by an equipment failure involves a widespread power outage, and an economic loss increases due to difficulties in power recovery and supply.

To minimize such a loss, it is required to diagnose a current state of a transformer as accurately as possible. It is necessary to minimize unpredictable accidents of transformers by performing required management and maintenance.

The largest share of cases in transformer accidents is related to the degradation of dielectric strength. The dielectric breakdown of a transformer may involve an explosion due to characteristics thereof. As the most effective method of analyzing insulation degradation characteristics, dissolved gas analysis (DGA) is frequently used. Organic insulating materials, such as insulating oil and insulating paper, used in transformers are increased in temperature due to operation and cause local overheats.

Also, degraded products including various gases are generated through pyrolysis caused by an electric discharge and the like. Gases among the degraded products are dissolved in the insulating oil. For this reason, it is possible to estimate whether there is an abnormality in a transformer by regularly sampling the insulating oil of the transformer in operation and analyzing the concentrations of dissolved gases. However, when a transformer state is simply determined on the basis of the pattern of a specific gas, whether a specific gas exceeds a reference value, etc., it is difficult to make an accurate diagnosis so as to choose management, maintenance, or replacement of the transformer.

Consequently, there is necessity for a method of not only diagnosing the cause of an abnormality in a transformer but also diagnosing a transformer state more clearly than existing methods.

SUMMARY OF THE INVENTION

The present invention is directed to solving all of the above-described problems.

The present invention is also directed to diagnosing a state of a transformer more accurately by correcting dissolved gas data.

The present invention is also directed to diagnosing a state of a transformer more accurately by determining whether the oil of the transformer is filtered.

Representative configurations of the present invention for achieving the above objects are as follows.

One aspect of the present invention provides a method of determining a transformer state on the basis of correction of dissolved gas data. The method comprises receiving, by a transformer state determination apparatus, dissolved gas data, determining, by the transformer state determination apparatus, a measurement error value which is a correction target in the dissolved gas data, correcting, by the transformer state determination apparatus, the measurement error value and determining, by the transformer state determination apparatus, a transformer state on the basis of the dissolved gas data including the corrected measurement error value.

Also, the determining of the measurement error value comprises determining, by the transformer state determination apparatus, the measurement error value on the basis of the dissolved gas data in consideration of whether oil filtering is performed.

Also, the correcting of the measurement error value comprises correcting, by the transformer state determination apparatus, the measurement error value on the basis of a similar data set which is similar to a data set including the measurement error value.

One aspect of the present invention provides an apparatus for determining a transformer state on the basis of correction of dissolved gas data. The apparatus comprising a dissolved gas data input part configured to receive dissolved gas data; and a processor operatively connected to the dissolved gas data input part, wherein the processor receives dissolved gas data, determines a measurement error value which is a correction target in the dissolved gas data, corrects the measurement error value, and determines a transformer state on the basis of the dissolved gas data including the corrected measurement error value.

Also, the processor determines the measurement error value on the basis of the dissolved gas data in consideration of whether oil filtering is performed.

Also, the processor corrects the measurement error value on the basis of a similar data set which is similar to a data set including the measurement error value.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 5 is a set of tables illustrating a method of determining a measurement error value (correction target) on the basis of whether oil filtering is performed according to the exemplary embodiment of the present invention.

DETAILED DESCRIPTION OF EXEMPLARY EMBODIMENTS

Figure 1:
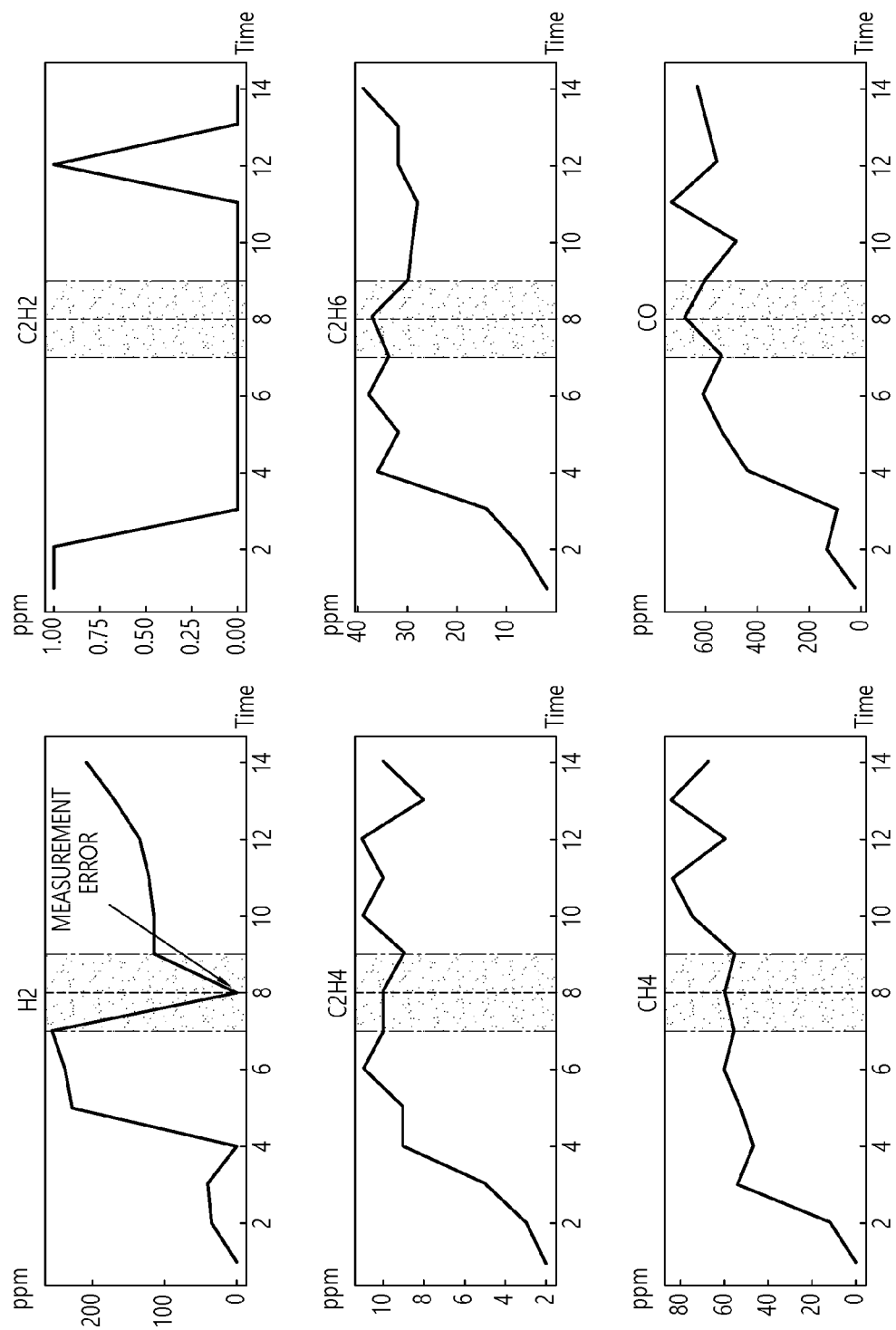
FIG. 1 is a set of graphs showing a measurement error in existing analysis of dissolved gases.

Detailed descriptions of the present invention will be made with reference to the accompanying drawings illustrating specific embodiments of the present invention as examples. These embodiments will be described in detail such that the present invention can be performed by those skilled in the art. It should be understood that various embodiments of the present invention are different but are not necessarily mutually exclusive. For example, a specific shape, structure, and characteristic of an embodiment described herein may be implemented in another embodiment without departing from the scope and spirit of the present invention. In addition, it should be understood that a position or an arrangement of each component in each disclosed embodiment may be changed without departing from the scope and spirit of the present invention. Accordingly, there is no intent to limit the present invention to detailed descriptions to be described below. The scope of the present invention is defined by the appended claims and encompasses all equivalents that fall within the scope of the appended claims. Like numbers refer to equal or like functions throughout the description of the figures.

Hereinafter, in order for those skilled in the art to easily perform the present invention, exemplary embodiments of the present invention will be described in detail with reference to the accompanying drawings.

A state of an existing transformer is determined through periodic oil (or insulating oil) sampling and analysis of gases dissolved in the oil (or insulating oil) (i.e., dissolved gas analysis (DGA)). Specifically, data of dissolved gas, which is sampled from a transformer and analyzed, is compared with a rule-based international standard of the Institute of Electrical and Electronic Engineers (IEEE), the International Electrotechnical Commission (IEC), the Electric Technology Research Association (ETRA) of Japan, or the International Council on Large Electric Systems (CIGRE) to diagnose a current state of the transformer.

Specifically, a transformer is a static machine that transfers electric energy between two or more circuits through an inductive electrical conductor and serves to change an alternating current (AC) voltage according to a purpose of use. In particular, a transformer is essentially required by production and development facilities which continuously consume a specific level of electric power. A failure of a transformer leads to a huge property loss and casualties. Accordingly, a diagnosis technology for ensuring the reliability of a transformer and maintaining the transformer is actively under development.

A transformer frequently used in transformer devices is filled with an oil (or insulating oil) which is an insulating material and thus has merits such as excellent insulating and cooling performance, low manufacturing costs, and the like. In a transformer, abnormal gases and degraded products are generated due to overheating caused by an electrical problem and/or a mechanical problem, degradation of the oil or a solid insulating material, and the like. The generated abnormal gases and degraded products are dissolved in the oil so that dissolved gas components and gas amounts in the oil may vary. Gas chromatography may be used to analyze dissolved gas components and gas amounts in the oil.

For example, a state (or failure) of a transformer may be diagnosed on the basis of IEEE Std C57.104-2008, a reference for diagnosing a transformer state with dissolved gas amounts, IEEE Std C57.104-2008, a reference for diagnosing a transformer failure with a composition ratio of dissolved gases, or the like.

However, the data of dissolved gases may not be accurately measured under some circumstances. In this case, it is difficult to accurately diagnose a state of a transformer.

FIG. 1 is a set of graphs showing a measurement error in existing analysis of dissolved gases.

FIG. 1 shows dissolved gas amounts of an oil that are periodically measured and an $H_2$ gas measurement error.

Referring to FIG. 1, due to structural characteristics of a transformer, a sealed space is filled with the oil, and generated dissolved gases gradually are increased in the oil over time. However, when the insulating oil is exposed to the air during a process of sampling the insulating oil of the transformer or gas chromatography is not properly performed, a measurement error may occur as shown in FIG. 1.

In other words, since the insulating oil is present in the sealed space, only a specific gas may not be drastically reduced over time in the insulating oil which is not filtered. Referring to the measurement results of FIG. 1, a value of $H_2$ gas in the periodically measured dissolved gas data is suddenly reduced at a specific time point. When the amount of a gas in the insulating oil is drastically reduced as compared to existing measurement values, this may be determined as a measurement error.

A measurement error leads to an error in determining a state of the transformer. Accordingly, a technology for correcting a measurement error is necessary, but such a technology has not been developed yet. Consequently, a method of determining a transformer state on the basis of correction of dissolved gas data according to an exemplary embodiment of the present invention sets forth a method of determining a measurement error value of a specific gas in periodically measured dissolved gas data and correcting the measurement error value on the basis of a statistical missing value imputation model to reduce misdiagnoses of a transformer state.

Figure 2:
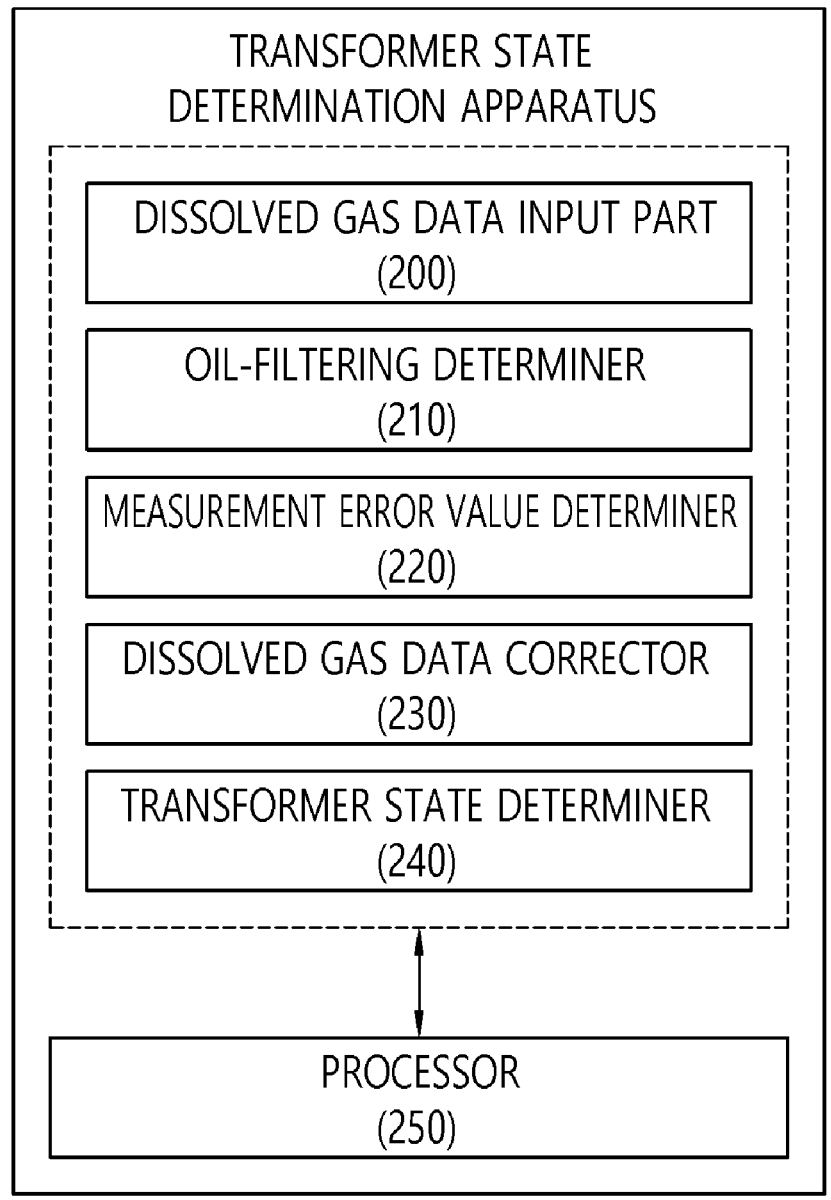
FIG. 2 is a block diagram of an apparatus for determining a transformer state on the basis of correction of dissolved gas data according to an exemplary embodiment of the present invention.

FIG. 2 is a block diagram of an apparatus for determining a transformer state on the basis of correction of dissolved gas data according to an exemplary embodiment of the present invention.

Referring to FIG. 2, the transformer state determination apparatus may include a dissolved gas data input part 200, an oil-filtering determiner 210, a measurement error value determiner 220, a dissolved gas data corrector 230, a transformer state determiner 240, and a processor 250.

The dissolved gas data input part 200 may be implemented to receive dissolved gas data. The dissolved gas data may include information on six kinds of dissolved gases measured in a transformer and/or component ratio information of the six kinds of dissolved gases.

The information on the six kinds of dissolved gases may include information on hydrogen ($H_2$), methane ($CH_4$), ethylene ($C_2H_4$), ethane ($C_2H_6$), acetylene ($C_2H_2$), and carbon monoxide (CO), and the component ratio information of the six kinds of dissolved gases may include information on a value of a specific dissolved gas versus the sum of values of the six kinds of dissolved gases.

In the present invention, dissolved gas data being corrected may be information on the amounts of the six kinds of dissolved gases included in an insulating oil (or oil).

The oil-filtering determiner 210 may be implemented to determine whether the oil of the transformer is filtered on the basis of the dissolved gas data. The oil-filtering determiner 210 may determine whether oil filtering is performed to determine whether to correct dissolved gas measurement data.

An oil-filtering task of removing impurities, moisture, gas, etc. of the oil in the entire transformer may be performed as periodic management or performed when a specific dissolved gas deviates from a normal range (e.g., a drastic increase). The oil-filtering task may lead to an improvement in insulating performance and a partial improvement in a state of the transformer.

Specifically, when an internal failure occurs in the transformer, heat is generated, and the insulating oil in contact with the heat is pyrolyzed so that gases including hydrogen ($H_2$), methane ($CH_4$), acetylene ($C_2H_2$), ethylene ($C_2H_4$), ethane ($C_2H_6$), etc. are generated. From cellulose insulation paper, methane ($CH_4$), hydrogen ($H_2$), carbon monoxide (CO), carbon dioxide ($CO_2$), etc. are generated. Accordingly, a specific gas is generated depending on a type of failure in the transformer, which may be determined through chromatography analysis of such major gases.

When the oil-filtering task is performed, continuous state degradation of the transformer is stopped in terms of transformer state prediction. In other words, a state prediction result may vary depending on the determination of whether oil filtering is performed in the transformer. When whether oil filtering is performed is not determined, this becomes a major problem in accurately determining the state of the transformer. Accordingly, whether oil filtering is performed in the transformer is determined, and then the state of the transformer is predicted.

A dissolved gas for determining whether the oil-filtering task is performed may be defined with the term "oil-filtering determination gas." For example, oil-filtering determination gases may be three kinds of dissolved gases (methane ($CH_4$), ethylene ($C_2H_4$), and ethane ($C_2H_6$)). The oil-filtering determiner 210 may determine whether oil filtering is performed by considering a change in the oil-filtering determination gases. For example, when oil-filtering determination gases, such as the three kinds of gases including methane ($CH_4$), ethylene ($C_2H_4$), and ethane ($C_2H_6$), are reduced to a threshold percentage (60%) or less, it may be determined that oil filtering is performed.

The measurement error value determiner 220 may be implemented to determine measurement error values in the dissolved gas data. The measurement error values may include an unmeasured value, such as a missing value, and an abnormal-range value, such as a value deviating from a normal range based on existing gas-specific measurement values. As an example of a measurement error value, a missing value is described for convenience, but a measurement error value may be not only a missing value but also a value deviating from a normal range determined on the basis of a gas-specific learning model. For example, when oil filtering is not performed, dissolved gases in the insulating oil gradually increase over time due to structural characteristics of the transformer. When a measurement value of a specific gas is reduced to a threshold value or less, the measurement value may be determined as deviating from the normal range.

The dissolved gas data corrector 230 may be implemented to correct the dissolved gas data. The dissolved gas data corrector 230 may correct the measurement error values determined by the measurement error value determiner 220.

The dissolved gas data corrector 230 may determine whether the measurement error values can be corrected in consideration of whether oil filtering is performed, whether there are measurement values around the measurement error values, etc. and correct the measurement error values. A correctable measurement error value among the measurement error values may be referred to as a "measurement error value (correction target)."

First, on the basis of whether oil filtering is performed, a measurement error value corresponding to an oil-filtering time point at which oil filtering is performed is corrected, and a measurement error value corresponding to a time point other than the oil-filtering time point may be corrected. Next, the dissolved gas data corrector 230 may correct the measurement error values in consideration of whether previous measurement values and subsequent measurement values are present on the basis of the measurement error values.

The dissolved gas data corrector 230 may perform a correction procedure for a correctable measurement error value (correction target) on the basis of surrounding measurement values. The dissolved gas data corrector 230 may perform a first correction procedure and/or a second correction procedure, which will be described in detail below.

The transformer state determiner 240 may determine a transformer state on the basis of the dissolved gas data corrected by the dissolved gas data corrector 230. For example, a transformer state may be determined as one of normal, warning, critical, and fault.

The processor 250 may be implemented to control operation of the dissolved gas data input part 200, the oil-filtering determiner 210, the measurement error value determiner 220, the dissolved gas data corrector 230, and/or the transformer state determiner 240. The processor 250 may be operatively connected to the dissolved gas data input part 200, the oil-filtering determiner 210, the measurement error value determiner 220, the dissolved gas data corrector 230, and/or the transformer state determiner 240.

In the present invention, a method of determining a transformer state on the basis of correction of dissolved gas data may include an operation in which a transformer state determination apparatus receives dissolved gas data, an operation in which the transformer state determination apparatus determines a measurement error value, which is a correction target, in the dissolved gas data, an operation in which the transformer state determination apparatus corrects the measurement error value, and an operation in which the transformer state determination apparatus determines a transformer state on the basis of the dissolved gas data including the corrected measurement error value.

The operation of determining a measurement error value may include an operation in which a transformer state determination apparatus determines a measurement error value in consideration of whether oil filtering is performed on the basis of the dissolved gas data. Also, the operation of correcting the measurement error value may include an operation in which the transformer state determination apparatus corrects the measurement error value on the basis of a similar data set which is similar to a data set including the measurement error value.

The method of determining a transformer state on the basis of correction of dissolved gas data will be described in detail below.

Figure 3:
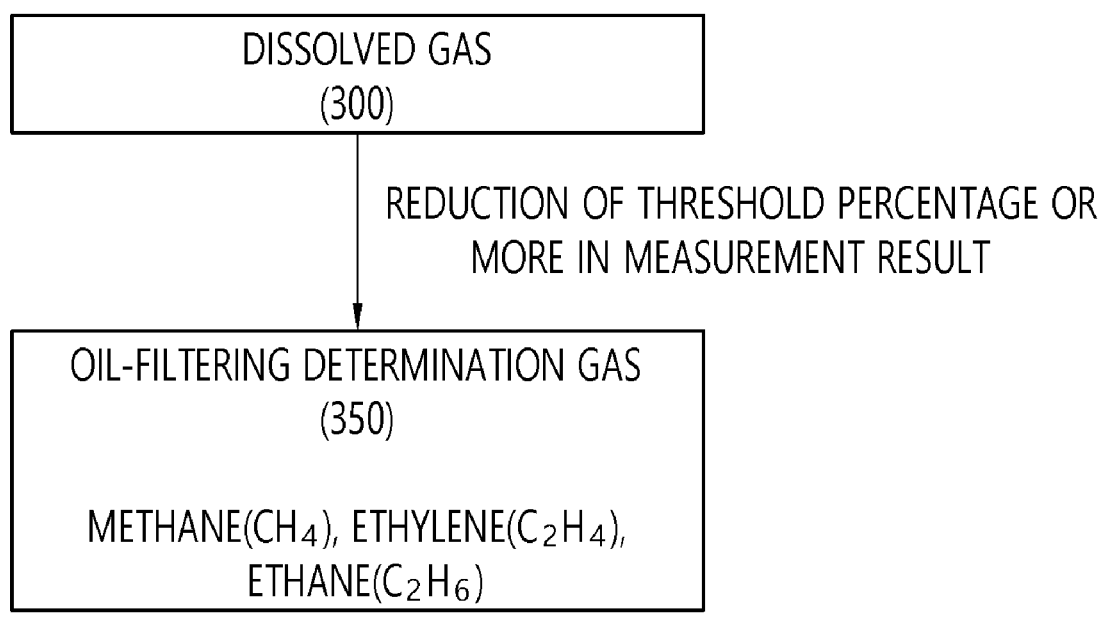
FIG. 3 is a conceptual diagram illustrating a method of determining whether oil filtering is performed according to the exemplary embodiment of the present invention.

FIG. 3 is a conceptual diagram illustrating a method of determining whether oil filtering is performed according to the exemplary embodiment of the present invention.

FIG. 3 shows a method of deciding an oil-filtering determination gas for the oil-filtering determiner to determine whether oil filtering is performed.

Referring to FIG. 3, whether oil filtering is performed may be determined on the basis of an oil-filtering determination gas 350 which may increase accuracy in determining whether oil filtering is performed among six kinds of dissolved gases 300.

Specifically, the oil-filtering determination gas 350 may be a gas which is reduced by a threshold percentage or more as a result of measuring after an oil-filtering task. In the exemplary embodiment of the present invention, it may be determined that oil filtering is performed when three kinds of gases including methane ($CH_4$), ethylene ($C_2H_4$), and ethane ($C_2H_6$) among the six kinds of dissolved gases 300 are simultaneously reduced by the threshold percentage (e.g., 60%) or more at a subsequent measuring time point.

Dissolved gases which may not be selected as the oil-filtering determination gas 350 may be a gas which is lost into the air by the threshold percentage or more during oil sampling, a gas of which a data spread is a threshold value or more, and a gas of which a data variation or a data generation amount is a threshold value or less.

In the present invention, for example, for example, $H_2$ among the six kinds of gases is frequently lost into the air during oil sampling and thus corresponds to a gas of which data accuracy is low. CO corresponds to a gas of which a data spread is too large, and $C_2H_2$ is a gas which is not generated in most cases other than an arc fault. In other words, $H_2$, CO, and $C_2H_2$ may not be selected as the oil-filtering determination gas 350.

Table 1 below shows data of actual dissolved gases in a transformer in which oil filtering is performed. The data is about the six kinds of dissolved gases 300 in the oil which was filtered in 2015. The unit may be parts per million (ppm).

TABLE 1

| Transformer | Diagnosis Time | $H_2$ | $CH_4$ | $C_2H_4$ | $C_2H_6$ | $C_2H_2$ | CO |
|---|---|---|---|---|---|---|---|
| MTR001 | 2013 | 8 | 0 | 7 | 1 | 5 | 156 |
|  | 2015 | 0 | 0 | 10.1 | 4.1 | 8.6 | 226.9 |
|  | 2015 | 0 | 0 | 0.7 | 1.3 | 2.2 | 36.2 |
|  | 2017 | 5.54 | 0 | 7.14 | 2.19 | 4.4 | 132.24 |
|  | 2018 | 5.9 | 0 | 15.8 | 1 | 8.5 | 248.6 |
|  | 2019 | 5.3 | 0 | 9.6 | 7.5 | 16.9 | 171.8 |

It may be seen that the three kinds of gases including methane ($CH_4$), ethylene ($C_2H_4$), and ethane ($C_2H_6$) are reduced to 60% or less. The three kinds of gases (or at least one of the three kinds of gases) may be used as the oil-filtering determination gas 350 to determine whether oil filtering is performed.

The oil-filtering determination gas 350 is exemplary, and another oil-filtering determination gas may be used to determine whether oil filtering is performed. Such an embodiment may also fall within the scope of the present invention.

Figure 4:
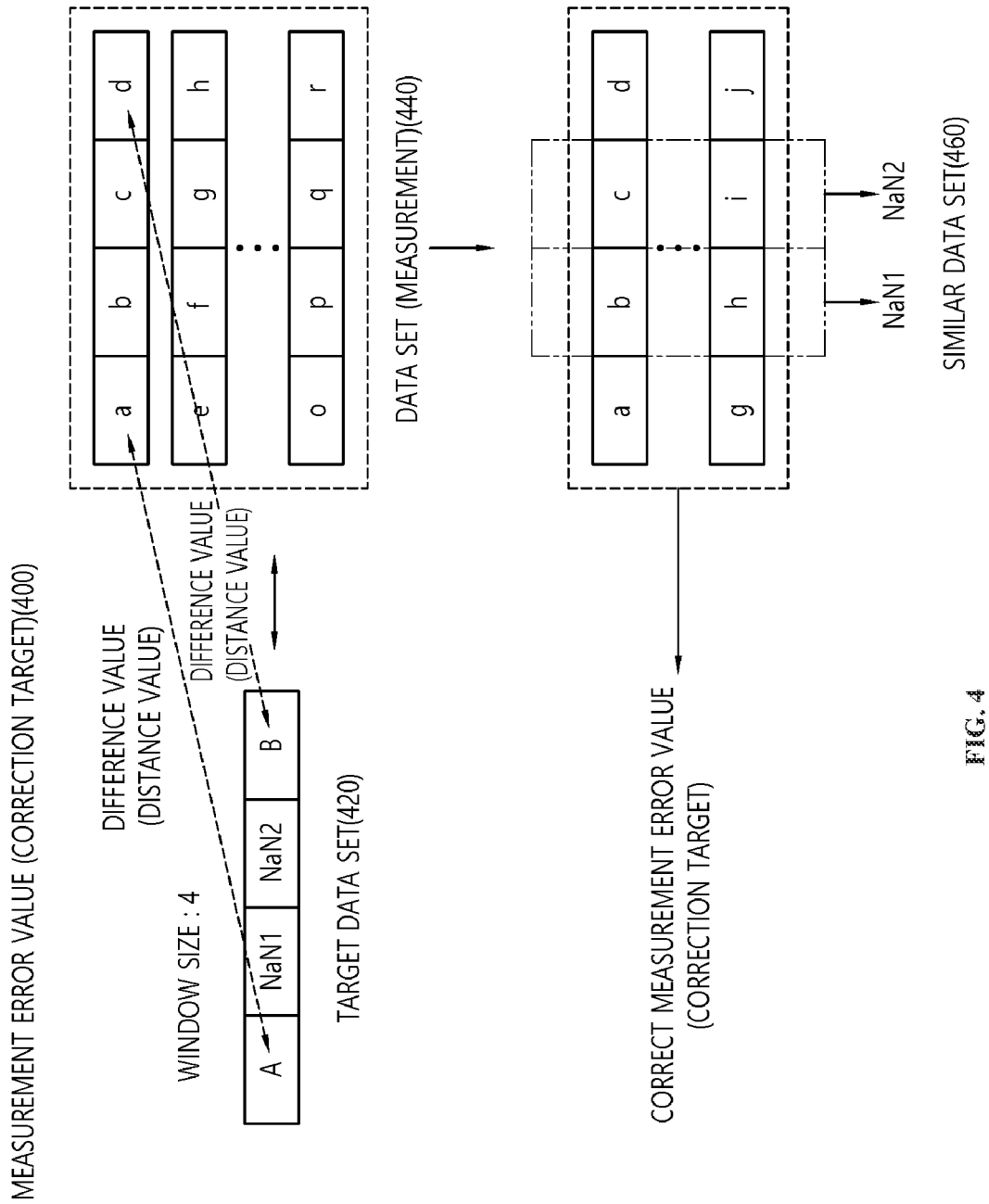
FIG. 4 is a conceptual diagram illustrating a method of correcting dissolved gas measurement data according to the exemplary embodiment of the present invention.

FIG. 4 is a conceptual diagram illustrating a method of correcting dissolved gas measurement data according to the exemplary embodiment of the present invention.

FIG. 4 shows a statistics-based measurement error value correction model for correcting dissolved gas measurement data.

Referring to FIG. 4, statistics-based measurement error value correction may be performed on the basis of a similar data set which is similar to a target data set 420 including a measurement error value (correction target) 400. As described above, the dissolved gas data corrector may correct the measurement error value (correction target) which is to be corrected among measurement error values in consideration of whether oil filtering is performed, whether a measurement value is present subsequent to the measurement error value, and the like.

The measurement error value (correction target) 400 may be estimated on the basis of k pieces of neighboring data close to the measurement error value (correction target) 400 and surrounding measurement values of the measurement error value (correction target) 400 so that the measurement error value (correction target) 400 may be corrected. For example, the target data set 420 including the measurement error value (correction target) 400 and surrounding data of the measurement error value (correction target) 400 may be compared with data sets (measurement) 440 including measurement values measured in advance. Among the data sets (measurement) 440, the data set (measurement) 440 highly similar to the target data set 420 may be determined as a similar data set 460. In other words, the similar data set 460 may be a data set close to the target data set 420. A threshold number of similar data sets may be determined, and the measurement error value (correction target) may be corrected on the basis of values included in the threshold number of similar data sets.

Specifically, similarity analysis may be performed on the basis of measurement values included in the target data set 420 other than the measurement error value (correction target) to find the similar data set 460 which is similar to the target data set 420 included in the measurement error value (correction target).

The size of a window (or a data set) for similarity analysis may be determined, and the number of pieces of data to be included in the target data set 420 may be determined. Then, the similar data set 460 which is similar to the target data set 420 may be searched for on the basis of a first measurement value to an $n^{th}$ measurement value included in the target data set 420.

The similar data set 460 may be determined to be higher ranking as the difference value (or a distance value) between each of the first measurement value to the $n^{th}$ measurement value included in the target data set 420 and each of the corresponding first' measurement value to the corresponding $n^{th}$' measurement value included in the data sets (measurement) 440 becomes smaller.

A distance calculation technique for calculating a distance between measurement values to determine the similar data set 460 is Euclidean distance, Manhattan distance, Mahalanobis distance, or the like, which may be selectively used as necessary.

The similar data set 460 may be determined in consideration of n-year data about each of dissolved gases. A window size for determining the similar data set 460 may be set differently depending on dissolved gases and may also be set differently depending on the distribution (or amount) of accumulated data.

Alternatively, according to the exemplary embodiment of the present invention, different data sets may be set for a case in which oil filtering is performed and a case in which oil filtering is not performed so that the similar data set 460 may be determined. Specifically, first data sets (measurement) may only include measurement data of a case in which oil filtering is not performed within a threshold time, and second data sets (measurement) may only include measurement data of a case in which oil filtering is performed within the threshold time.

In the case of correcting the measurement error value (correction target) of an oil-filtering time point later by separately using the first data sets (measurement) and the second data sets (measurement), a similar data set may be determined on the basis of a data set varying according to whether oil filtering is performed within a threshold time point. For example, when surrounding measurement values for correcting the measurement error value (correction target) include a measuring time point within a threshold period after the oil-filtering time point, a similar data set may be determined in the second data sets (measurement) to correct the measurement error value (correction target).

FIG. 5 is a set of tables illustrating a method of determining a measurement error value (correction target) on the basis of whether oil filtering is performed according to the exemplary embodiment of the present invention.

FIG. 5 shows a method of determining whether oil filtering is performed on the basis of oil-filtering determination gases 500 and determining whether to correct a measurement error value (correction target) on the basis of measurement error value correction model.

Referring to FIG. 5, three kinds of gases ($CH_4$, $C_2H_4$, $C_2H_6$) among the six kinds of dissolved gases may be the oil-filtering determination gases 500. When the oil-filtering determination gases 500 are simultaneously reduced by a threshold percentage (e.g., 60%) or more, it may be determined that oil filtering is performed.

As described above, to determine whether oil filtering is performed, it may be determined whether $CH_4$, $C_2H_4$, and $C_2H_6$ gases spread within a fixed variation range are reduced by the threshold percentage or more.

As shown in FIG. 5, a time point at which values of the oil-filtering determination gases 500 are drastically reduced or measured to be zero may be determined as a time point at which oil filtering is performed. A correction procedure may not be performed on a measurement error value of a section including an oil-filtering time point 520. On the other hand, a correction procedure may be performed on a measurement error value of a section not including the oil-filtering time point 520. In other words, a measurement error value of the section including the oil-filtering time point 520 is not set as a measurement error value (correction target) and is not subjected to a correction procedure.

For example, a value of $H_2$ measured on July 1997 corresponding to the oil-filtering time point 520 is 0 ppm which is reduced from 26 ppm and thus may be determined as a measurement error value. However, oil filtering was performed in July 1997, and a correction algorithm may not work on the value corresponding to the oil-filtering time point 520. On the other hand, a measurement error value among measurement values of November 1997 or later may be a measurement error value (correction target) to which the correction algorithm is applied. For example, among values measured on November 1997, March 198, August 1998, and December 1998 after the oil-filtering time point, measurement error values are determined as measurement error values (correction target), and the correction algorithm may be applied thereto. Specifically, when a value of $H_2$ measured on August 1998 and a value of $C_2H_6$ measured on March 1998 are measurement error values (correction target), a correction procedure may be performed on the measurement error values (correction target) on the basis of the correction algorithm. The correction algorithm for measurement error values (correction target) will be described below.

Figure 6:
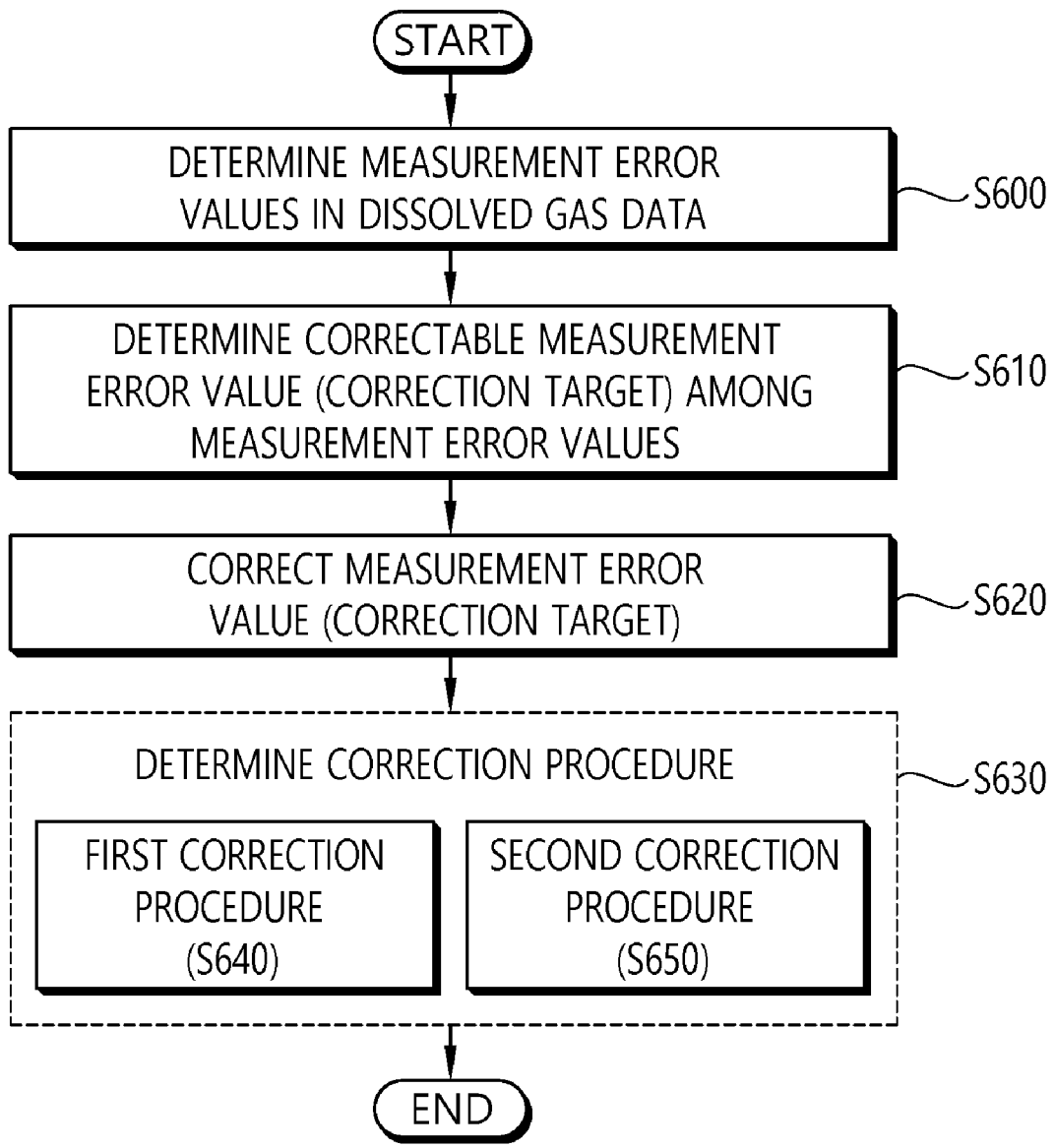
FIG. 6 is a conceptual diagram illustrating a method of correcting a dissolved gas according to the exemplary embodiment of the present invention.

FIG. 6 is a conceptual diagram illustrating a method of correcting a dissolved gas according to the exemplary embodiment of the present invention.

FIG. 6 shows a first correction procedure and a second correction procedure for dissolved gas correction.

Referring to FIG. 6, measurement error values may be determined in dissolved gas measurement data (operation S600).

As described above, measurement error values may include an unmeasured value, such as a missing value, and an abnormal-range value such as a value deviating from a normal range based on existing gas-specific measurement values.

Among the measurement error values, correctable measurement error values (correction target) may be determined (operation S610).

Among the measurement error values, a measurement error value corresponding to an oil-filtering time point may be excluded from correction targets. Also, when there is not a preceding measurement value and/or a subsequent measurement value of a measurement error value in the measurement error values, the measurement error value may be excluded from correction targets. When the measurement error values are determined, a measurement error value may not have a preceding measurement value and a subsequent measurement value. In this case, correction shows low accuracy, and thus an additional correction procedure may not be performed.

The measurement error values (correction target) may be corrected (operation S620).

When a measurement error value (correction target) is data of a section in which oil-filtering is not performed and there is a subsequent measurement value, the measurement error value (correction target) may be corrected.

Whether to perform a first correction procedure or a second correction procedure may be determined (operation S630), and the first correction procedure (operation S640) or the second correction procedure (operation S650) may be performed on the basis of the determination. The first correction procedure (operation S640) or the second correction procedure (operation S650) may be selectively performed on a plurality of measurement error values included in a target data set.

The first correction procedure (operation S640) may be a correction procedure of determining a measurement error value (correction target) on the basis of a previous measurement value in the target data set.

The second correction procedure (operation S650) may be a correction procedure based on the statistics-based measurement error value correction described above with reference to FIG. 4.

When any target data set which is set on the basis of all possible windows (hereinafter, "available windows") including the measurement error value (correction target) does not include a threshold number of pieces of data with which the statistics-based measurement error value correction may be accurately performed, the first correction procedure (operation S640) may be performed.

Specifically, the first correction procedure (operation S640) may be performed when the following conditions are satisfied.

Condition (first correction procedure): any target data sets which are set on the basis of available windows including the measurement error value (correction target) do not include a measurement value as the first value and the last value.

On the other hand, the second correction procedure may be performed when the condition for the first correction procedure is not satisfied. Specifically, the second correction procedure (operation S660) may be performed when the following conditions are satisfied.

Condition (second correction procedure): a target data set which is set on the basis of an available window including the measurement error value includes a measurement value as the first value and the last value.

Measurement values for determining whether the condition (first correction procedure) and the condition (second correction procedure) are satisfied may include a measurement error value (correction target) which has already been corrected. In other words, after a measurement error value (correction target) is corrected through the first correction procedure or the second correction procedure, the corrected measurement error value is determined as a measurement value so that it may be determined whether the condition (first correction procedure) and the condition (second correction procedure) are satisfied.

The first correction procedure and the second correction procedure may be performed on the basis of the above conditions.

The reason that the first correction procedure and the second correction procedure are separately performed is that, when a specific measurement value (e.g., a first value and/or a last value in a data set) is not present, the second correction procedure which is a statistics-based measurement error value correction procedure shows low correction accuracy.

A window size used to determine a data set for the first correction procedure and the second correction procedure may be set differently depending on dissolved gases and also the distribution (or amount) of accumulated data.

Figure 7:
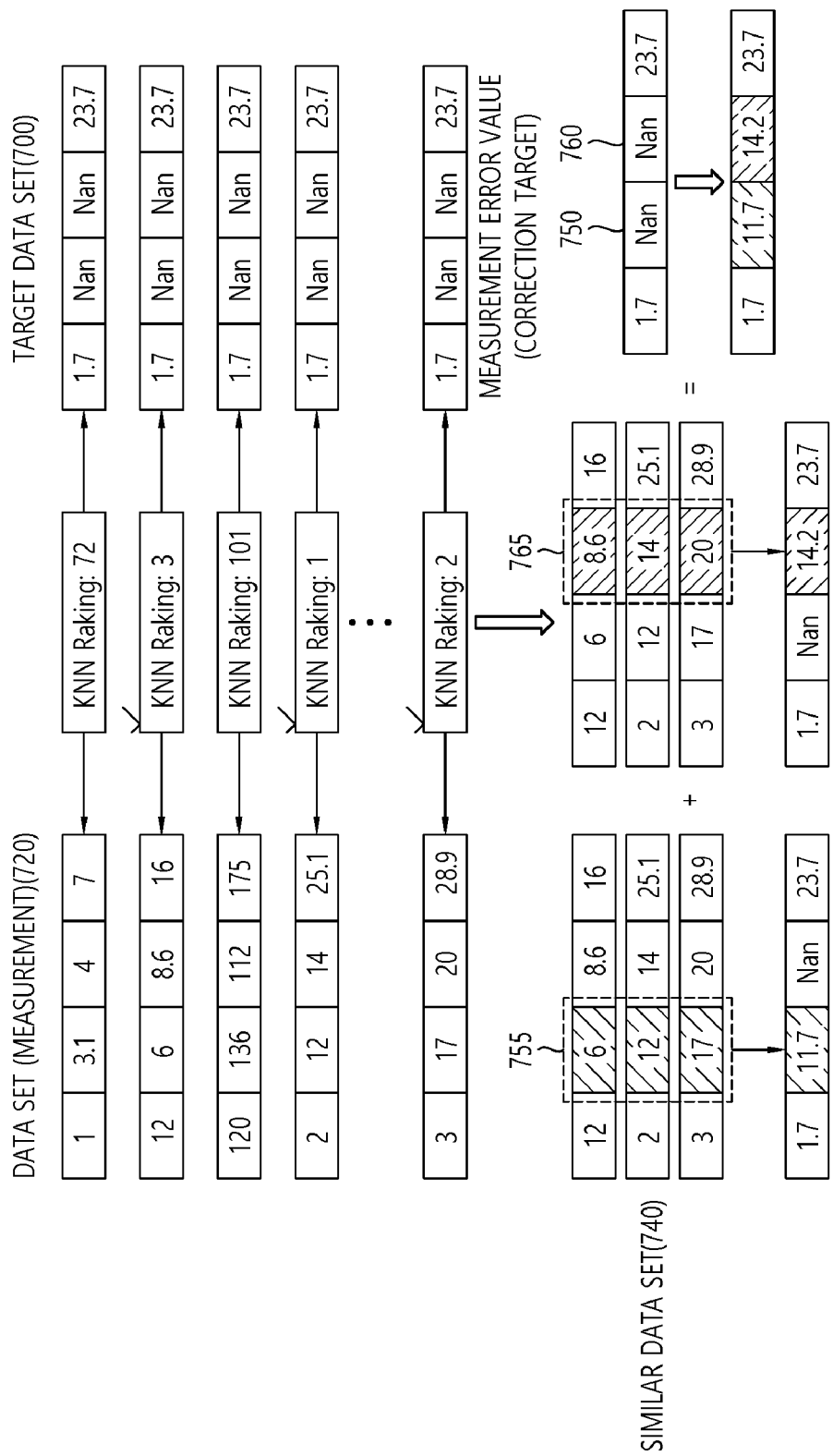
FIG. 7 is a conceptual diagram illustrating the second correction procedure of performing statistics-based measurement error value correction according to the exemplary embodiment of the present invention.

FIG. 7 is a conceptual diagram illustrating the second correction procedure of performing statistics-based measurement error value correction according to the exemplary embodiment of the present invention.

FIG. 7 shows the second correction procedure which is a statistics-based measurement error value correction procedure of correcting measurement error values (correction target) in a target data set on the basis of the target data set and data sets (measurement).

Referring to FIG. 7, k-nearest neighbors (KNN)-based rankings may be determined between data sets 720 and a target data set 700 including a measurement target (correction target). A data set (measurement) which has higher similarity to the target data set 700 may have a higher ranking.

When a threshold number of data sets (measurement) 720 having relatively high rankings are determined as similar data sets 740 among the data sets (measurement) 720, corresponding measurement values in the target data set 700 may be determined on the basis of measurement values 755 and 765 included in the similar data sets 740.

For example, a first measurement error value (correction target) 750 is included as a second value in the target data set 700, and the average of second measurement values 755 included in the similar data sets 740 may be determined as the first measurement error value (correction target) 750. A second measurement error value (correction target) 760 is included as a third value in the target data set 700, and the average of third measurement values 765 included in the similar data sets 740 may be determined as the second measurement error value (correction target) 760.

Figure 8:
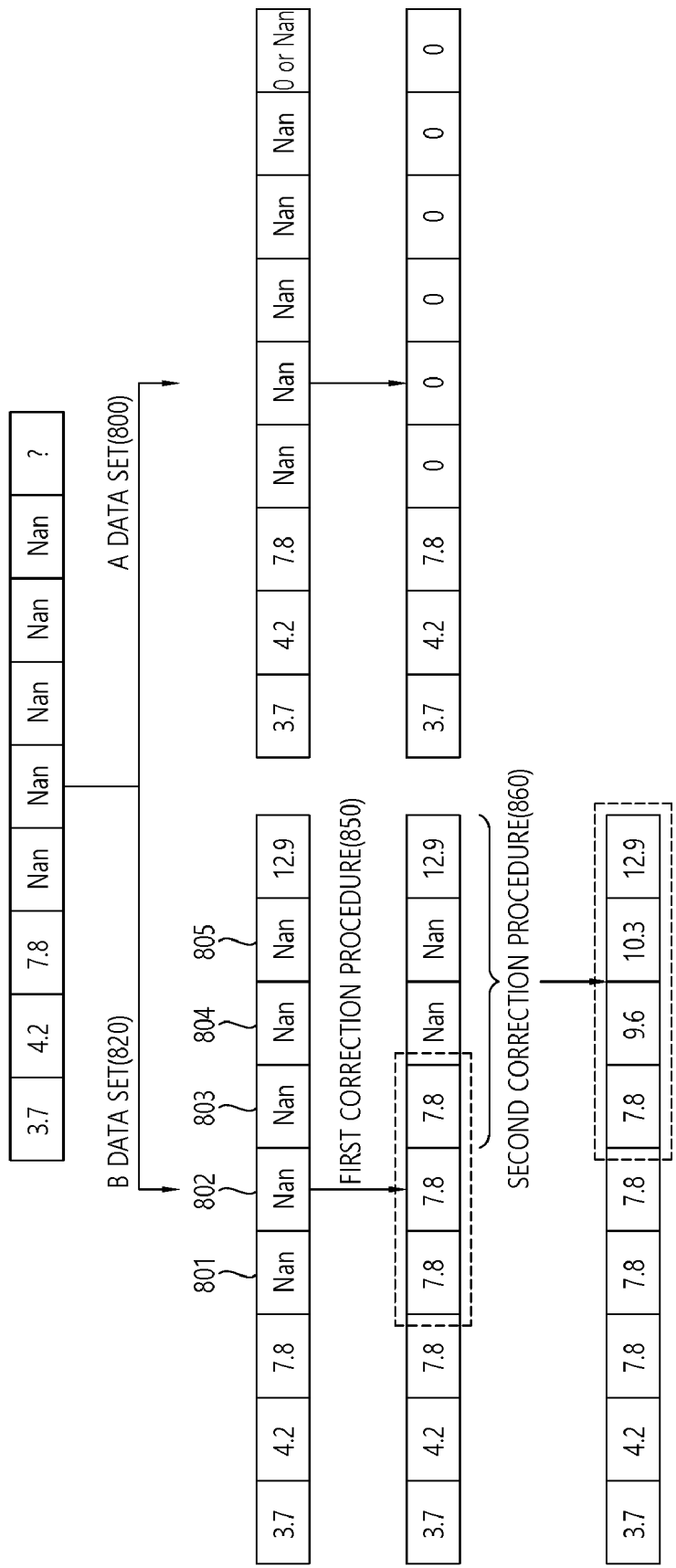
FIG. 8 is conceptual diagram illustrating a method of correcting a measurement error value (correction target) according to the exemplary embodiment of the present invention.

FIG. 8 is conceptual diagram illustrating a method of correcting a measurement error value (correction target) according to the exemplary embodiment of the present invention.

FIG. 8 shows a method of determining a correctable measurement error value (correction target) among measurement error values and correcting the measurement error value (correction target).

Referring to FIG. 8, when there is no measurement value after measurement error values as shown in A data set 800, the measurement error values may not be corrected and may be determined as uncorrectable values.

On the other hand, when there is a measurement value after measurement error values as shown in B data set 820, the measurement error values may be determined as measurement error values (correction target) and corrected.

Assuming that a window size is 4 and four pieces of data are included in a target data set, the following correction procedure may be performed.

1. Since a first measurement error value (correction target) 801 satisfies the above-described condition (first correction procedure), a first correction procedure 850 may be performed on the first measurement error value (correction target) 801. In other words, the first measurement error value (correction target) 801 may be corrected to be 7.8 which is a previous measurement value.

2. Since a second measurement error value (correction target) 802 satisfies the above-described condition (first correction procedure), the first correction procedure 850 may be performed on the second measurement error value (correction target) 802. In other words, the second measurement error value (correction target) 802 may be corrected to be 7.8 which is the previous measurement value.

3. Since a third measurement error value (correction target) 803 satisfies the above-described condition (first correction procedure), the first correction procedure 850 may be performed on the third measurement error value (correction target) 803. In other words, the first measurement error value (correction target) 801 may be corrected to be 7.8 which is the previous measurement value.

4. Since a fourth measurement error value (correction target) 804 and a fifth measurement error value (correction target) 805 satisfy the above-described condition (second correction procedure), a second correction procedure 860 may be performed on the fourth measurement error value (correction target) 804 and the fifth measurement error value (correction target) 805.

In this way, measurement error values (correction target) included in B data set 820 may be determined through the first correction procedure 850 and the second correction procedure 860.

The above-described embodiments of the present invention may be implemented as the form of a computer instruction that can be executed through various computer components and may be recorded in computer readable recording media. The computer readable recording media may include a program instruction, a data file, and a data structure, and/or combinations thereof. The program instruction recorded in the computer readable recording media may be specially designed and prepared for the present invention or may be an available well-known instruction for those skilled in the field of computer software. Examples of the computer readable recording media include, for example, magnetic media such as a hard disk, a floppy disk, and a magnetic tape, optical media such as a compact disc read only memory (CD-ROM) and a digital video disc (DVD), magneto-optical media such as a floptical disk, and a hardware device, such as a read only memory (ROM), a random access memory (RAM), or a flash memory, that is specially made to store and perform the program instruction. Examples of the program instruction may include a machine code generated by a compiler and a high-level language code that can be executed in a computer using an interpreter. Such a hardware device may be configured as at least one software module in order to perform operations of the present invention and vice versa.

While the present invention has been described with reference to specific details such as detailed components, specific embodiments and drawings, these are only examples to facilitate overall understanding of the present invention and the present invention is not limited thereto. It will be understood by those skilled in the art that various modifications and alterations may be made.

Therefore, the spirit and scope of the present invention are defined not by the detailed description of the present invention but by the appended claims and encompass all modifications and equivalents that fall within the scope of the appended claims.

What is claimed is:

1. A method of determining a transformer state on the basis of correction of dissolved gas data, the method comprising:

receiving, by a transformer state determination apparatus, dissolved gas data;

determining, by the transformer state determination apparatus, a correctable measurement error value in the dissolved gas data based on whether oil filtering was performed, the correctable measurement error value excluding a measurement error value corresponding to an oil-filtering time point and a measurement error value that does not have at least one of a preceding measurement value or a subsequent measurement value;

correcting, by the transformer state determination apparatus, the correctable measurement error value; and determining, by the transformer state determination apparatus, a transformer state on the basis of the dissolved gas data including the corrected correctable measurement error value.

2. The method of claim 1, wherein the correcting of the correctable measurement error value comprises correcting, by the transformer state determination apparatus, the correctable measurement error value on the basis of a similar data set which is similar to a data set including the correctable measurement error value.

3. The method of claim 1, wherein whether oil filtering was performed is determined based on an oil-filtering determination gas which does not include $H_2$, $CO_2$ and $C_2H_2$.

4. An apparatus for determining a transformer state on the basis of correction of dissolved gas data, the apparatus comprising:

a dissolved gas data input part configured to receive dissolved gas data; and a processor operatively connected to the dissolved gas data input part, wherein the processor receives dissolved gas data, determines a correctable measurement error value in the dissolved gas data based on whether oil filtering was performed, the correctable measurement error value excluding a measurement error value corresponding to an oil-filtering time point and a measurement error value that does not have at least one of a preceding measurement value or a subsequent measurement value, corrects the correctable measurement error value, and determines a transformer state on the basis of the dissolved gas data including the corrected correctable measurement error value.

5. The apparatus of claim 4, wherein the processor corrects the correctable measurement error value on the basis of a similar data set which is similar to a data set including the correctable measurement error value.

6. The method of claim 4, wherein whether oil filtering was performed is determined based on an oil-filtering determination gas which does not include $H_2$, $CO_2$ and $C_2H_2$.

* * * * *